(12) United States Patent
Bryan et al.

(10) Patent No.: US 10,377,389 B2
(45) Date of Patent: Aug. 13, 2019

(54) LOAD MANAGEMENT TO EXTEND ELECTRIC VEHICLE RANGE

(71) Applicant: Ford Global Technologies, LLC, Dearborn, MI (US)

(72) Inventors: Seth Anthony Bryan, Royal Oak, MI (US); Bryan Michael Bolger, Canton, MI (US); Robert David Hancasky, Royal Oak, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/453,130

(22) Filed: Mar. 8, 2017

(65) Prior Publication Data

US 2018/0257666 A1 Sep. 13, 2018

(51) Int. Cl.
| | |
|---|---|
| *B60W 50/10* | (2012.01) |
| *B60W 10/08* | (2006.01) |
| *B60W 10/30* | (2006.01) |
| *B60L 15/00* | (2006.01) |
| *B60L 15/20* | (2006.01) |
| *B60L 1/02* | (2006.01) |
| *B60H 1/00* | (2006.01) |

(52) U.S. Cl.
CPC ......... *B60W 50/10* (2013.01); *B60H 1/00385* (2013.01); *B60H 1/00764* (2013.01); *B60H 1/00964* (2013.01); *B60H 1/00985* (2013.01); *B60L 1/02* (2013.01); *B60L 15/2045* (2013.01); *B60W 10/08* (2013.01); *B60W 10/30* (2013.01); *B60H 2001/00992* (2013.01); *B60L 2250/18* (2013.01); *B60L 2260/52* (2013.01); *B60L 2260/54* (2013.01); *B60W 2540/00* (2013.01); *B60W 2710/086* (2013.01); *B60W 2710/30* (2013.01); *Y02T 10/645* (2013.01); *Y02T 10/7283* (2013.01)

(58) Field of Classification Search
None
See application file for complete search history.

(56) References Cited

U.S. PATENT DOCUMENTS

| | | | |
|---|---|---|---|
| 9,008,874 B2* | 4/2015 | Wippler | B60L 15/2045 340/439 |
| 9,079,586 B2* | 7/2015 | Crombez | B60W 30/182 |
| 9,625,765 B2* | 4/2017 | Momose | G02F 1/1339 |
| 2010/0225276 A1* | 9/2010 | Sugiyama | H01M 10/052 320/118 |
| 2012/0109413 A1* | 5/2012 | Smith | B60L 11/1877 701/1 |
| 2012/0191279 A1* | 7/2012 | Wippler | B60L 15/2045 701/22 |

(Continued)

*Primary Examiner* — Thomas G Black
*Assistant Examiner* — Demetra R Smith-Stewart
(74) *Attorney, Agent, or Firm* — David Kelley; Brooks Kushman P.C.

(57) ABSTRACT

A vehicle includes a controller that prompts a user to confirm a willingness to accept a reduced maximum acceleration or speed responsive to user confirmation of a desire to increase an electric drive range by a user selected amount. The controller further operates a propulsion system with the reduced maximum acceleration or speed to increase the electric drive range responsive to user confirmation of the willingness.

20 Claims, 5 Drawing Sheets

(56) References Cited

U.S. PATENT DOCUMENTS

| | | | |
|---|---|---|---|
| 2014/0236467 A1* | 8/2014 | Liu | B60L 11/1862 |
| | | | 701/123 |
| 2015/0369872 A1 | 12/2015 | Meyer et al. | |
| 2016/0061610 A1* | 3/2016 | Meyer | G01C 21/26 |
| | | | 701/22 |
| 2016/0129918 A1* | 5/2016 | Skaff | B60W 50/14 |
| | | | 340/455 |
| 2016/0200212 A1 | 7/2016 | Six | |
| 2016/0250944 A1 | 9/2016 | Christ et al. | |
| 2016/0356616 A1* | 12/2016 | Woon | B60L 11/1861 |
| 2016/0375786 A1* | 12/2016 | Liu | B60L 11/1861 |
| | | | 701/22 |
| 2017/0028852 A1* | 2/2017 | Skaff | B60K 35/00 |
| 2017/0072879 A1* | 3/2017 | Weinberg | B60R 16/0236 |

* cited by examiner

US 10,377,389 B2

LOAD MANAGEMENT TO EXTEND ELECTRIC VEHICLE RANGE

TECHNICAL FIELD

This application is generally related to controlling auxiliary high voltage loads and limiting powertrain operation to increase a range of operation of an electric vehicle.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery.

SUMMARY

A vehicle includes a propulsion system and a controller. The controller, responsive to user confirmation of a desire to increase an electric drive range by a user selected amount, prompts a user to confirm a willingness to accept a reduced maximum acceleration or speed. The controller further, responsive to user confirmation of the willingness, operates the propulsion system with the reduced maximum acceleration or speed to increase the electric drive range.

A method includes, by a controller, responsive to user confirmation of a desire to increase an electric drive range of a vehicle by a user selected amount, prompting a user to confirm a willingness to accept a reduced maximum power for a climate system, and responsive to user confirmation of the willingness to accept the reduced maximum power, operating the climate system with the reduced maximum power to increase the electric drive range.

A control system for an electric vehicle includes a climate system, a propulsion system including a propulsion motor, and a controller. The controller, in response to a distance-to-empty (DTE) range falling below a predetermined threshold, allocates available energy between the climate system and propulsion system according to an allocation table indicative of a user preference to increase the range above the predetermined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

High-voltage vehicular systems (i.e., systems having an operational voltage of 60V DC or greater) are often used in hybrid vehicles. These high-voltage systems include heating, ventilation and air conditioning (HVAC) systems, propulsion systems, and chassis systems. An HVAC system may include a Positive Temperature Coefficient (PTC) heating element, an A/C compressor, and an electric machine to filter and circulate air. Chassis systems may include steering systems and active suspension systems. A propulsion system may include a DC/DC converter, a DC/AC inverter, and an electric machine coupled to the vehicle's wheels to provide propulsive force. Also, the vehicle may include a display and touch panel configured to provide a graphical user interface to configure a controller to control the high-voltage systems.

Figure 1:
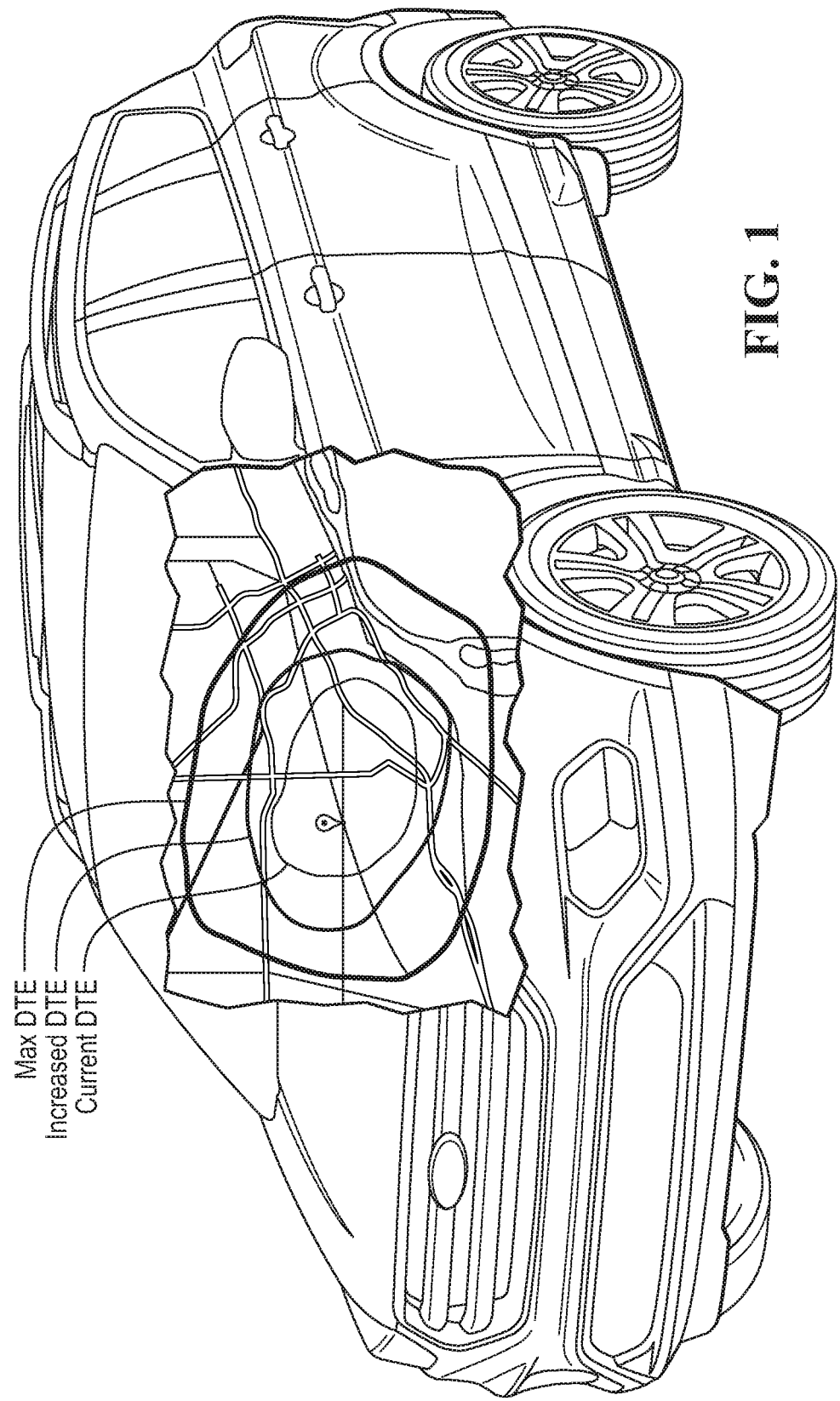
FIG. 1 is a diagram of a hybrid vehicle with a selectable range extending operational controller.

FIG. 1 depicts a hybrid vehicle displaying a map on a screen having three distinct circumferences. Each circumference encloses an area in which the vehicle may travel based on a calculated distance to empty (DTE). The DTE includes an electric distance to empty (EDTE) that is defined as a distance that the vehicle may travel using electricity stored in the battery alone, and a combined distance to empty (CDTE) that is defined as a distance that the vehicle may travel using electricity stored in the battery and fuel for an internal combustion engine (e.g., diesel or gasoline) that is stored in a fuel tank. Here the use of DTE will be used to indicate EDTE however many of the principles disclosed also are applicable to CDTE. The DTE is determined by an operational configuration of at least one controller selected by a user (e.g., HVAC usage, seat heaters, acceleration requests) and a current state of energy stored by the vehicle. For example, DTE may be based on a current battery state of charge (SOC) and historical data including normal operational limits of an HVAC system of the vehicle, normal operational limits of the powertrain of the vehicle, speed of the vehicle, and may also include a current fuel reservoir level. The historical information may further include current data such as a current vehicle's speed. The fuel reservoir level may include a current battery state of charge (SOC) and/or a fuel level (e.g., gasoline or diesel level). In another example, an increased DTE may be based on moderate operational limitations selected such as a 10% reduction in acceleration power, a 15% reduction in total output power (e.g., top speed), and a 25% reduction in climate control power usage. Further, a maximum DTE may be based on maximum operational limitations selected such as a 25% reduction in acceleration power, a 25% reduction in total output power (e.g., top speed), and a 100% reduction in climate control power usage. Based on the current fuel reservoir level, HVAC configuration, propulsion configuration, and desired route, a controller is able to provide an estimated DTE. In the event that a desired location is outside of the area within the circumference (DTE range), the controller may proportion power to vehicle subsystems based on an allocation that has been input to the controller by a user. The allocation may limit energy flowing to selected systems according to an allocation table that assigns an amount or limit to be proportioned to each system. For example, an allocation may be according to an allocation table that includes a percentage between climate system operation and propulsion.

A controller with a user selectable interface to operate vehicular systems to extend an estimated range while providing a notification is disclosed. The notification includes feedback that may be used to solicit, from the operator, confirmation that they are aware of the resulting tradeoffs in performance or acceptance to the tradeoffs. Here, the controller or operator may select from a list of attributes or functions that can be reduced/turned off or left alone for the purpose of increasing DTE range. The customer may select what attributes they are willing to turn-off and which to keep. Once the list of attributes to be reduced has been selected, by the controller or operator, the system determines an increase in the DTE range and conveys the increase to the operator via user interface, such as a navigation screen map having DTE rings overlaid onto the map.

Here, the "current DTE" is displayed as a first loop which is the DTE range available with the current vehicular setting, such as all features enabled. The next loop is an "increased DTE" that is a reduced operational mode, such as limited cooling and acceleration. The largest loop is the Max DTE" loop that is a limited operational mode in which all selectable functions are disabled or limited to a minimum threshold to allow the greatest increase in DTE range. For example, acceleration may be limited while HVAC may be disabled.

A first method may include estimating the current distance to empty (DTE) range and soliciting a target range increase. Calculating via a controller required tradeoffs such as reduced torque, top speed, accessory load, etc. Notifying the operator of the tradeoffs. And operating vehicular systems according to the tradeoffs to achieve the range. For example, consider a vehicle with a Historical Base Distance to Empty of 40 miles. The operator, user, or controller (e.g., a navigation system, a driver information center, an infotainment system) selects a range increase (e.g., the increase may be +5%, +10%, or +15% or the increase may be +2 km, +5 km, or +10 km). The controller then calculates required tradeoffs and outputs a notification (e.g., reduce acceleration by X %, reduce top speed by Y mph, reduced climate control by Z %). The user or operator then accepts either expressly or by the lack of canceling the change, and the controller then operates the vehicle powertrain and high-voltage accessories accordingly.

A second method may include a controller that, while the vehicle is in motion, calculates a base historical DTE and additional DTE's at multiple reduced power levels considering predetermined tradeoffs. The controller may then notify the operator of the tradeoffs and solicit acceptance of the tradeoffs either expressly or implied after a passage or a predetermined time or expiration of a timer, after which the controller would operate the vehicle according to the tradeoffs to achieve the range increase. For example, consider a vehicle with a Historical Base Distance to Empty of 40 miles. An operator or user may then select an increase range (e.g., DTE=+5 miles, +10 miles, or +20 miles). The controller then outputs a notification of system level tradeoffs (e.g., Reduced acceleration by X %, Reduced top speed by Y mph, or Reduced climate power by Z %). User accepts and controller operates powertrain according to the tradeoffs.

A third method may include a controller that solicit, from a user or operator, a selection from a list of attributes to be traded off (e.g., Cooling, Heating, Acceleration, or Top Speed). Based on either dynamic or predetermined settings, a controller will solicit a reduced or limited setting. The reduced setting reduces the power allotted to a limited number of selected attributes, and the limited setting further limits the power allotted to the selected attributes as compared to 'Reduced' level. The controller then calculates and outputs the increase range (e.g., overlaying multiple range loops on a map indicative of a DTE range for each mode (e.g., Normal operation DTE, Reduced mode DTE, or Limited mode DTE). The controller then solicits which mode to enter and confirms either expressly or via expiration of a timer. For example, a user pre-selects attributes for Reduced Mode: heating and cooling and for Limited Mode: heating, cooling, acceleration, Top Speed. The controller may then output a DTE for each mode (e.g., Normal operation DTE=~19-mile radius, Reduced mode DTE=~22-mile radius, or Limited mode DTE=~28-mile radius). If a desired DTE is greater than the current DTE, the controller may select reduced mode for operation after which the controller operates at lower HVAC performance.

Figure 2:
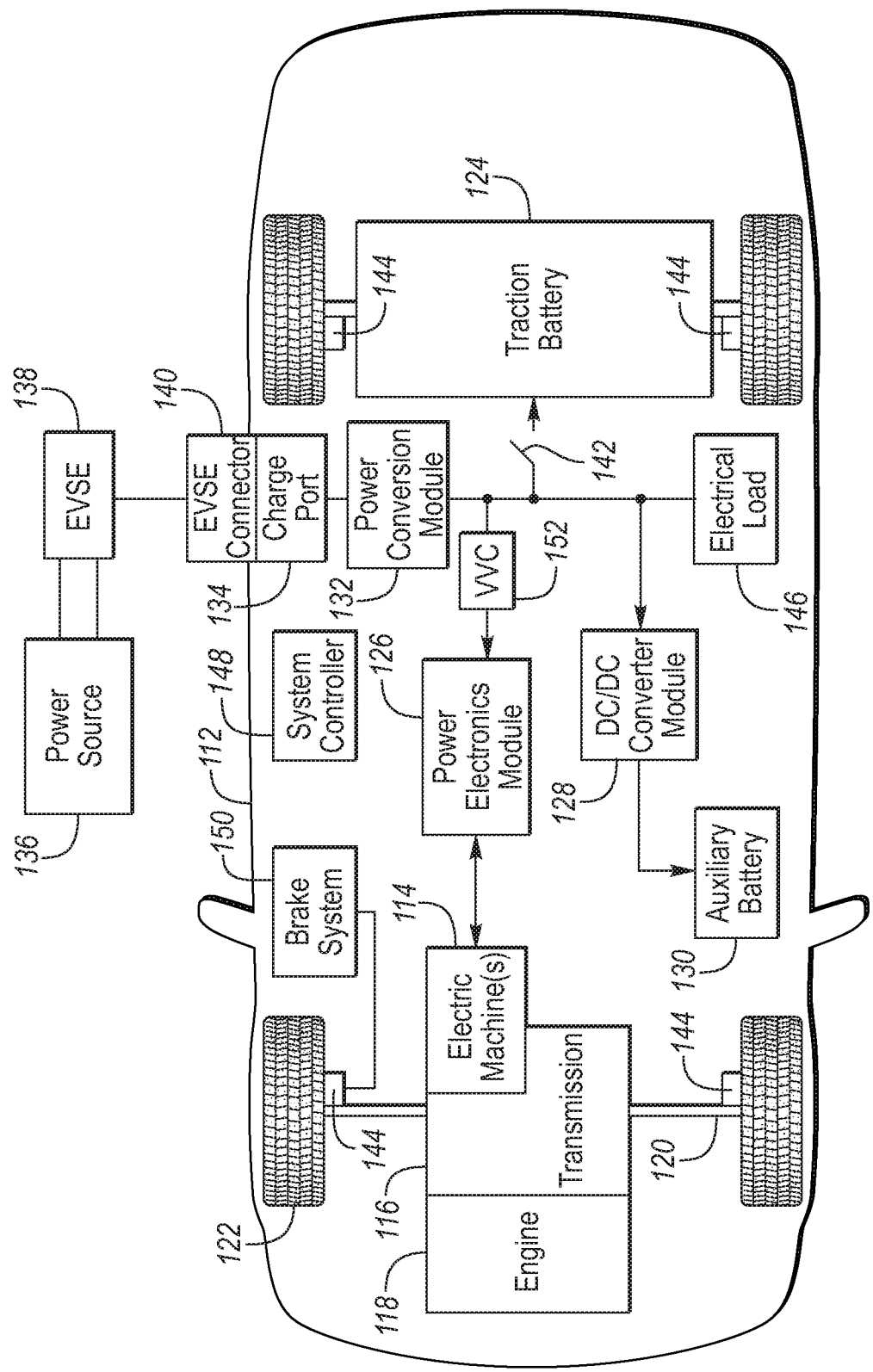
FIG. 2 is a diagram of a hybrid vehicle illustrating typical drivetrain and energy storage components with a variable voltage converter and power inverter therebetween.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 3:
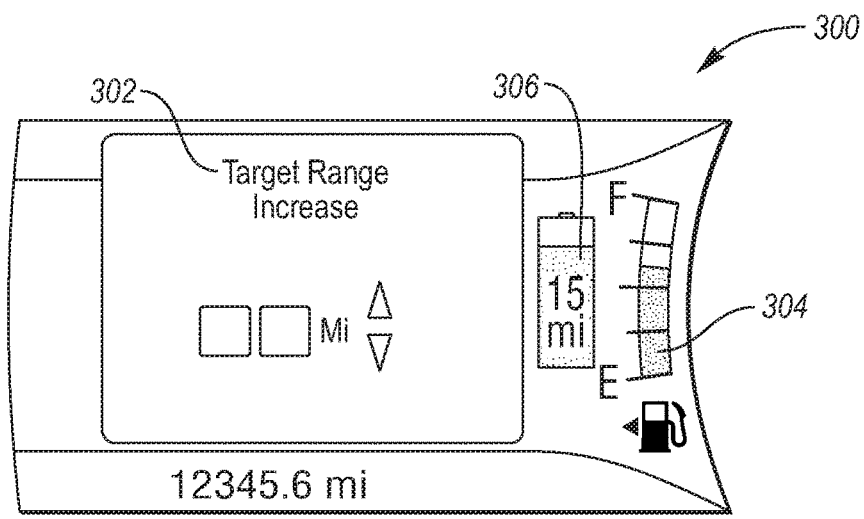
FIG. 3 is a diagram of a graphical user interface to select an operational mode based on a desired increase in range.

FIG. 3 is a diagram of a graphical user interface configured to solicit input from a user to select an operational mode based on a desired increase in range. Here, the graphical user interface may include a vehicle cluster, a driver information console, a heads up display, a center display, an infotainment display, or other vehicle display. The display system 300 is used to solicit data by displaying a specific graphic such as an icon or phrase and receiving specific input associated with the graphic. For example, the graphic may include a sub-window 302 that includes a phrase such as "Target Range Increase", a fuel icon 304, and a battery icon 306. The fuel icon 304 may include an area of the icon that is distinguishable to indicate a fuel level. The area may be distinguishable by using color, shading or other illustrative methods. Likewise, the battery icon 306 may include an area of the icon that is distinguishable to indicate a battery state of charge (SOC) level by using color, shading or other illustrative methods. A controller may be configured to output data such as a phrase "target range increase" to solicit input that the controller may use to generate a desired magnitude of range increase. Here, the input is based on the desired magnitude of range increase after which the controller may calculate a predicted magnitude, set the predicted magnitude equal to the desired magnitude, operate the powertrain and other high-voltage loads to achieve the predicted magnitude. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 4:
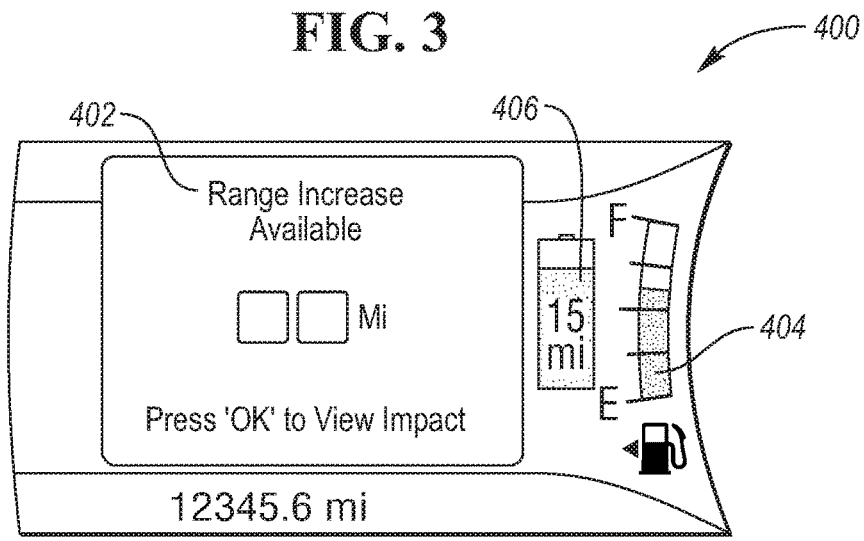
FIG. 4 is a diagram of a graphical user interface to confirm an operational mode based on an available increase in range.

FIG. 4 is a diagram of a graphical user interface to confirm an operational mode based on an available increase in range. Here, the graphical user interface may include a vehicle cluster, a driver information console, a heads up display, a center display, an infotainment display, or other vehicle display. The display system 400 is used to solicit data by displaying a specific graphic such as an icon or phrase and receiving specific input associated with the graphic. For example, the graphic may include a sub-window 402 that includes a phrase such as "Range Increase Available", a fuel icon 404, and a battery icon 406. The fuel icon 404 may include an area of the icon that is distinguishable to indicate a fuel level. The area may be distinguishable by using color, shading or other illustrative methods. Likewise, the battery icon 406 may include an area of the icon that is distinguishable to indicate a battery state of charge (SOC) level by using color, shading or other illustrative methods. A controller may be configured to output data such as a phrase "target range increase" to solicit input that the controller may use to generate a desired magnitude of range increase. Here, the input may be based calculating a maximum range increase prior to displaying the sub-window and displaying the maximum range increase in the sub-window and solicit a decrease from the maximum range to allow operation of the powertrain and other high-voltage loads to achieve the decrease from the maximum range. Also, the controller may be configured to display a percentage of the maximum range such that the controller may solicit either an increase or decrease from the displayed range. Based on the desired magnitude of range increase/decrease, the controller may operate the powertrain and other high-voltage loads to achieve the predicted magnitude. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 5:
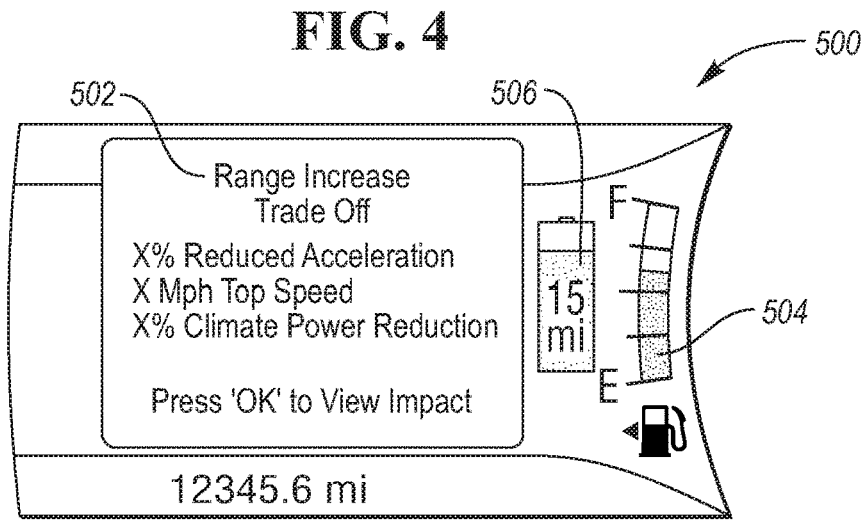
FIG. 5 is a diagram of a graphical user interface to select a balance of loads and powertrain operation to increase a range of operation.

FIG. 5 is a diagram of a graphical user interface (GUI) to select a balance of loads and powertrain operation to increase a range of operation. Here, the graphical user interface may include a vehicle cluster, a driver information console, a heads up display, a center display, an infotainment display, or other vehicle display. The display system 500 is used to solicit data by displaying a specific graphic such as an icon or phrase and receiving specific input associated with the graphic. For example, the graphic may include a sub-window 502 that includes a phrase such as "Range Increase Trade Off", a fuel icon 504, and a battery icon 506. The fuel icon 504 may include an area of the icon that is distinguishable to indicate a fuel level. The area may be distinguishable by using color, shading or other illustrative methods. Likewise, the battery icon 506 may include an area of the icon that is distinguishable to indicate a battery state of charge (SOC) level by using color, shading or other illustrative methods. A controller may be configured to output data such as phrases "Reduced Acceleration", "Reduced Top Speed", or "Reduced Climate Power" to solicit input that the controller may use to generate a desired magnitude of range increase and build a matrix used to control vehicle sub-systems. Here, the GUI solicits at least one characteristic selected from a group of operational characteristics. The controller then operates the electric powertrain and other high-voltage loads based on input of the at least one characteristic. For example, the GUI may display "% reduced acceleration" soliciting the user to enter a percentage reduction in acceleration. The controller may then convert this reduction percentage into a limit of torque available from an electric machine in the powertrain. And, the GUI may display "reduced top speed" soliciting the user to enter a reduction of a top speed in miles per hour or kilometers per hour. The controller may then convert this reduction into a limit of horsepower available from an electric machine in the powertrain. Also, the GUI may display "reduced climate power" soliciting the user to enter a reduction of power used by a climate system of the vehicle. The controller may then operate the climate system to achieve the reduction in power. This reduction in power may further be selectively applied to a heating sub-system or a cooling sub-system of the climate system. The heating sub-system may include a positive thermal coefficient (PTC) heating element, a blower to circulate air, or seat heaters. The cooling sub-system may include a compressor for an air conditioning unit, a blower to circulate air, or a seat cooling system. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 6:
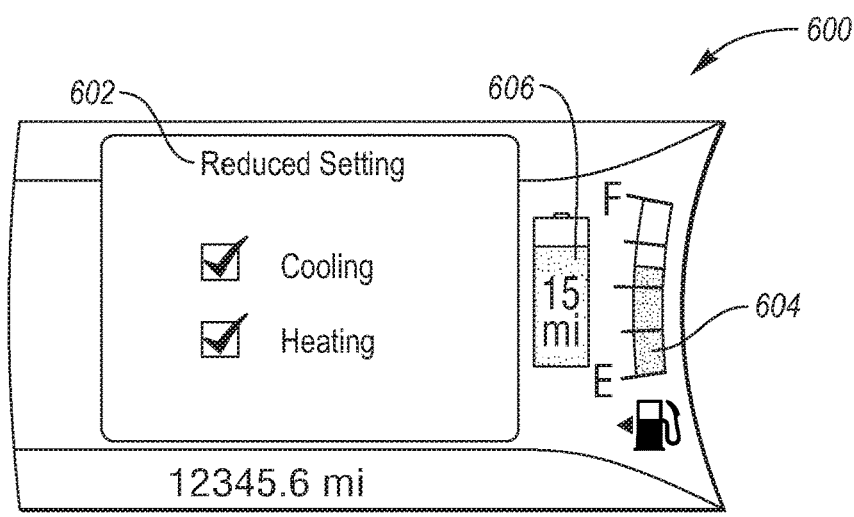
FIG. 6 is a diagram of a graphical user interface to select a reduced operating point for specific loads to increase a range of operation.

FIG. 6 is a diagram of a graphical user interface to select a reduced operating point for specific loads to increase a range of operation. The display system 600 is used to solicit data by displaying a specific graphic such as an icon or phrase and receiving specific input associated with the graphic. For example, the graphic may include a sub-window 602 that includes a phrase such as "Reduced Settings", a fuel icon 604, and a battery icon 606. The fuel icon 604 may include an area of the icon that is distinguishable to indicate a fuel level. The area may be distinguishable by using color, shading or other illustrative methods. Likewise, the battery icon 606 may include an area of the icon that is distinguishable to indicate a battery state of charge (SOC) level by using color, shading or other illustrative methods. A controller may be configured to output data such as phrases "Cooling" or "Heating" to solicit input that the controller may use to generate an operational matrix used to control vehicle sub-systems. Here, the GUI solicits at least one characteristic selected from a group of operational characteristics. The operational characteristics include heating, cooling, seat heating, seat cooling, rear seat heating, rear seat cooling, air ventilation blower speed, PTC heating, and other heating, ventilation, air conditioning (HVAC) characteristic. The controller then operates the electric powertrain and other high-voltage loads based on input of the at least one characteristic. For example, the GUI may display "cooling" soliciting the user to enter a reduction in cooling sub-system operation. The reduction may be in the form of a binary select or de-select box, or may be a numerical value, or a sliding scale used to produce a numerical value associated with a degree of reduction. The controller may then convert this reduction into a limit of power available for use by the vehicle systems. And, the GUI may display "heating" soliciting the user to enter a reduction in heating sub-system operation. The reduction may be in the form of a binary select or de-select box, or may be a numerical value, or a sliding scale used to produce a numerical value associated with a degree of reduction. The controller may then convert this reduction into a limit of power available for use by the vehicle systems. The controller may then convert this reduction into a limit of horsepower available from an electric machine in the powertrain. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 7:
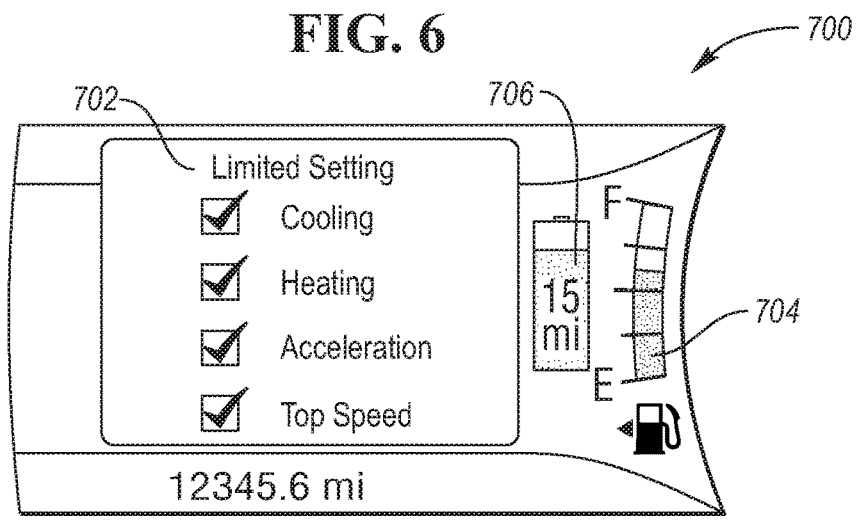
FIG. 7 is a diagram of a graphical user interface to select a reduced operating point for specific high voltage loads and powertrain operation to increase a range of operation.

FIG. 7 is a diagram of a graphical user interface to select a reduced operating point for specific high voltage loads and powertrain operation to increase a range of operation. The display system 700 is used to solicit data by displaying a specific graphic such as an icon or phrase and receiving specific input associated with the graphic. For example, the graphic may include a sub-window 702 that includes a phrase such as "Limited Settings", a fuel icon 704, and a battery icon 706. The fuel icon 704 may include an area of the icon that is distinguishable to indicate a fuel level. The area may be distinguishable by using color, shading or other illustrative methods. Likewise, the battery icon 706 may include an area of the icon that is distinguishable to indicate a battery state of charge (SOC) level by using color, shading or other illustrative methods. A controller may be configured to output data such as phrases "Cooling", "Heating", "Acceleration", and "Top Speed" to solicit input that the controller may use to generate an operational matrix used to control vehicle sub-systems. Here, the GUI solicits at least one characteristic selected from a group of operational characteristics. The operational characteristics may include the operation characteristics described in FIG. 6 and may further include acceleration, top speed. The controller then operates the electric powertrain and other high-voltage loads based on input of the at least one characteristic. For example, the GUI may display "cooling" soliciting the user to enter a reduction in cooling sub-system operation. The reduction may be in the form of a binary select or de-select box, or may be a numerical value, or a sliding scale used to produce a numerical value associated with a degree of reduction. The controller may then convert this reduction into a limit of power available for use by the vehicle systems. And, the GUI may display "heating" soliciting the user to enter a reduction in heating sub-system operation. The reduction may be in the form of a binary select or de-select box, or may be a numerical value, or a sliding scale used to produce a numerical value associated with a degree of reduction. The controller may then convert this reduction into a limit of power available for use by the vehicle systems. And, the GUI may display "acceleration" soliciting the user to enter a reduction in maximum torque. The reduction may be in the form of a binary select or de-select box, or may be a numerical value, or a sliding scale used to produce a numerical value associated with a degree of reduction. The controller may then convert this reduction into a limit of power available for use by the vehicle systems. And, the GUI may display "top speed" soliciting the user to enter a reduction in maximum horsepower. The reduction may be in the form of a binary select or de-select box, or may be a numerical value, or a sliding scale used to produce a numerical value associated with a degree of reduction. The controller may then convert this reduction into a limit of power available for use by the vehicle systems. The controller may then convert this matrix of selected operational parameter into a table to operate the vehicle powertrain and high-voltage loads. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 8:
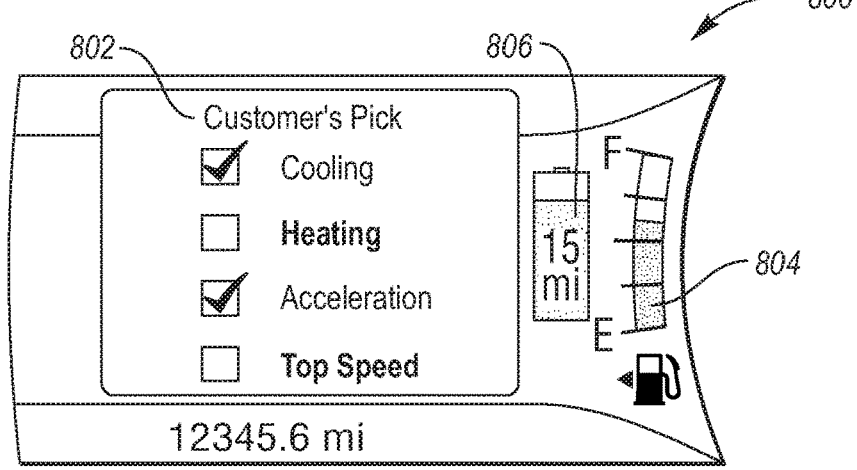
FIG. 8 is a diagram of a graphical user interface illustrating a selection of a reduced operating point for specific high voltage loads and powertrain operation limitations to increase a range of operation.

FIG. 8 is a diagram of a graphical user interface illustrating a selection of a reduced operating point for specific high voltage loads and powertrain operation limitations to increase a range of operation. The display system 800 is used to solicit data by displaying a specific graphic such as an icon or phrase and receiving specific input associated with the graphic. For example, the graphic may include a sub-window 802 that includes a phrase such as "Limited Settings", a fuel icon 804, and a battery icon 806. The fuel icon 804 may include an area of the icon that is distinguishable to indicate a fuel level. The area may be distinguishable by using color, shading or other illustrative methods. Likewise, the battery icon 806 may include an area of the icon that is distinguishable to indicate a battery state of charge (SOC) level by using color, shading or other illustrative methods. A controller may be configured to output data such as phrases "Cooling", "Heating", "Acceleration", and "Top Speed" to solicit input that the controller may use to generate an operational matrix used to control vehicle sub-systems. Here, "cooling" and "Acceleration" are selected and "Heating" and "Top Speed" are not selected such that the controller may limit power flowing to the cooling sub-system and reduce maximum torque of the powertrain to achieve a desired increase in range. In another embodiment, the controller solicits a change in operational characteristics that may include recommending based on historical operation, an ambient temperature, an operational status of the vehicle, a weather forecast, a traffic forecast along a route, or an elevation change along a route. The route may be determined based on a current location and a desired destination, or the route may be determined based on a current location, direction of travel, and map associated with the area. In instances in which no destination is provided, the controller may look to a predetermined value or threshold such as 10 miles, 15 miles, 20 miles, or 25 miles and when the DTE drops below the predetermined value, the controller may adjust operation according to the allocation table.

Here, the checked boxes cooling and acceleration may be selected by the controller based on an operational status of the vehicle, a weather forecast and a traffic forecast. For example, if the ambient temperature is 70 degrees F. and the vehicle internal combustion engine has been running such that the temperature of the engine coolant is heated to greater than 100 degrees F., the controller may recommend limiting cooling as that would require more energy than heating the passenger compartment via a standard heat exchanger. At some temperatures (e.g., 70 degrees F.) some people may feel chilled due to breezes when outside of the vehicle and when they enter the vehicle may desire to warm up, likewise at the same temperature, some people may feel warm and like to have a gentle breeze to cool them off. Here, the controller may provide a recommendation to increase fuel range while maintaining passenger comfort. Also, the controller may be configured to automatically limit operation of the recommended limitations. Further, the controller may look at real-time traffic data and make a recommendation based on the traffic data. For example, if the traffic is stop and go with multiple traffic lights on the road being traveled, the vehicle may limit acceleration as the acceleration may not significantly decrease the estimated time of arrival (ETA) based on traffic conditions and yet by limiting the acceleration, the power used may be significantly reduced. Although illustrated as a graphical user interface, in another embodiment, the interface may be an audible user interface in which the controller synthesizes voice, outputs a message based on the voice, and receives an audible input that may be translated to data that is used by the controller to control vehicular systems.

Figure 9:
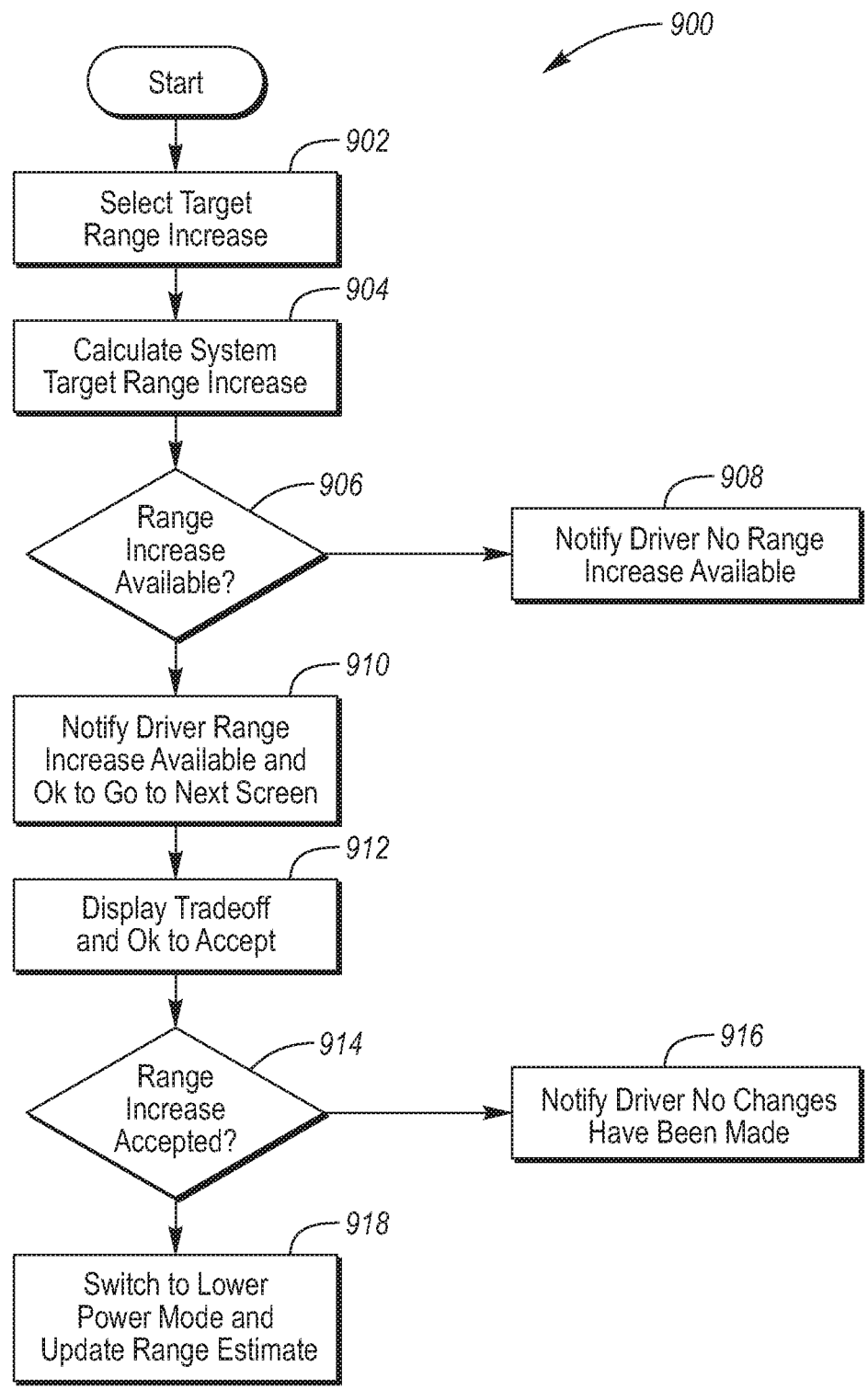
FIG. 9 is a flow diagram of a vehicular high voltage system control algorithm.

FIG. 9 is a flow diagram 900 of a vehicular high voltage system control algorithm. In operation 902, the controller solicits via a user interface, a target range increase. This includes outputting at least one message and receiving an input for the at least one message. The message may include a current range, a maximum available range, a percentage of the maximum available range, an operational characteristic as described in the figures above such as heating, cooling, acceleration, top speed, etc. The input may include a binary select or not selected, or an amount of reduction desired associated with each message. In operation 904, the controller generates an operational matrix based on the inputs and calculates a magnitude of range increase available.

In operation 906, the controller compares the magnitude of range increase available with the desired increase in range. If the desired increase in range is greater than the magnitude of range increase available, the controller branches to operation 908 and outputs a notification that the desired increase is not available. If the desired increase in range is less than the magnitude of range increase available, the controller branches to operation 910 and outputs a notification that the desired range increase is available and proceeds to operation 912.

In operation 912, the controller outputs a change in operational characteristic as described in the figures above such as heating, cooling, acceleration, top speed, etc. as selected by the user interface or recommended by the controller.

In operation 914, the controller may solicit confirmation of the change in operational characteristic as described in the figures above such as heating, cooling, acceleration, top speed, etc. as selected by the user interface. In another embodiment, the controller solicits a change in operational characteristics that may include recommending based on historical operation, an ambient temperature, an operational status of the vehicle, a weather forecast, a traffic forecast along a route, or an elevation change along a route as described in FIG. 8. In another embodiment, the recommendation may be capable of automatically being implemented by the controller such that a user may change the recommended setting, but does not need to as the notification may be output to the user interface for a predetermined time period, after which it is automatically accepted. If the change is declined by the user, the controller will branch to operation 916 and output a notification that no changes to vehicle operation have been made. If the changes are accepted either expressly or automatically, the controller will branch to operation 918 and configure the vehicle systems to operate to the increase range target.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a propulsion system; and
a controller configured to,
responsive to user confirmation of a desire to increase an electric drive range by a user selected amount, prompt a user to confirm a willingness to accept a reduced maximum acceleration or speed, and
responsive to user confirmation of the willingness, operate the propulsion system with the reduced maximum acceleration or speed to increase the electric drive range.

2. The vehicle of claim 1 further comprising a climate system, wherein the controller is further configured to, responsive to the user confirmation of the desire, prompt the user to confirm a willingness to accept a reduced maximum power for the climate system, and responsive to user confirmation of the willingness to accept the reduced maximum power, operate the climate system with the reduced maximum power to increase the electric drive range.

3. The vehicle of claim 2, wherein an amount of the reduced maximum power is defined by the user.

4. The vehicle of claim 1, wherein the controller is further configured to prompt the user to select which of the maximum acceleration, maximum speed, or both is to be reduced.

5. The vehicle of claim 1, wherein an amount of the reduced maximum acceleration or speed is defined by the user.

6. The vehicle of claim 1, wherein the user selected amount is a distance.

7. The vehicle of claim 6, wherein the distance has units of miles.

8. A method comprising:
by a controller,
responsive to user confirmation of a desire to increase an electric drive range of a vehicle by a user selected amount, prompting a user to confirm a willingness to accept a reduced maximum power for a climate system; and
responsive to user confirmation of the willingness to accept the reduced maximum power, operating the climate system with the reduced maximum power to increase the electric drive range.

9. The method of claim 8 further comprising, responsive to the user confirmation of the desire, prompting the user to confirm a willingness to accept a reduced maximum acceleration or speed of the vehicle, and responsive to user confirmation of the willingness to accept the reduced maximum acceleration or speed, operating the vehicle with the reduced maximum acceleration or speed to increase the electric drive range.

10. The method of claim 9, wherein an amount of the reduced maximum acceleration or speed is defined by the user.

11. The method of claim 9 further comprising prompting the user to select which of the maximum acceleration, maximum speed, or both is to be reduced.

12. The method of claim 8, wherein an amount of the reduced maximum power is defined by the user.

13. The method of claim 8, wherein the user selected amount is a distance.

14. The method of claim 13, wherein the distance has units of miles.

15. A control system for an electric vehicle comprising:
a propulsion system including a propulsion motor; and
a controller configured to,
receive a user-requested target miles increase;
responsive to the target miles increase, prompt a user to confirm a willingness to accept a reduced maximum acceleration or speed, and
responsive to user confirmation of the willingness, operate the propulsion system with the reduced maximum acceleration or speed to increase the electric drive range.

16. The control system of claim 15, wherein the propulsion motor is configured to operate at a torque and a power, and the controller is further configured to proportion available energy among torque and power.

17. The control system of claim 15 further comprising a climate system, wherein the controller is further configured to, responsive to the user confirmation of the willingness, prompt the user to confirm a willingness to accept a reduced maximum power for the climate system, and responsive to user confirmation of the willingness to accept the reduced maximum power, operate the climate system with the reduced maximum power to increase the electric drive range.

18. The control system of claim 17, wherein the climate system includes a positive temperature coefficient (PTC) heating element and an air conditioning (A/C) compressor, and the controller is further configured to proportion available energy among the PTC heating element and the A/C compressor.

19. The control system of claim 15 further comprising a user interface configured to solicit the target miles increase.

20. The control system of claim 19, wherein the user interface is a graphical user interface.

* * * * *